(12) United States Patent
Suzuki et al.

(10) Patent No.: US 10,926,701 B2
(45) Date of Patent: Feb. 23, 2021

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Ko Sato, Kanagawa (JP); Daisuke Tanaka, Kanagawa (JP); Yasuhiro Sakurai, Kanagawa (JP); Ryota Yamanaka, Kanagawa (JP); Junya Kobayashi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/625,490

(22) PCT Filed: Jul. 7, 2017

(86) PCT No.: PCT/JP2017/025007
§ 371 (c)(1),
(2) Date: Dec. 20, 2019

(87) PCT Pub. No.: WO2019/008760
PCT Pub. Date: Jan. 10, 2019

(65) Prior Publication Data
US 2020/0369204 A1 Nov. 26, 2020

(51) Int. Cl.
*B60R 1/00* (2006.01)
*G06K 9/00* (2006.01)
(Continued)

(52) U.S. Cl.
CPC ............ *B60R 1/00* (2013.01); *G06K 9/00812* (2013.01); *G08G 1/056* (2013.01); *G08G 1/143* (2013.01);
(Continued)

(58) Field of Classification Search
CPC . B60R 1/00; B60R 2300/105; B60R 2300/20; B60R 2300/607;
(Continued)

(56) References Cited

U.S. PATENT DOCUMENTS 10,163,016 B2   12/2018   Hayakawa
2007/0146165 A1  6/2007   Tanaka
(Continued)

FOREIGN PATENT DOCUMENTS

CA      3002638 A1    4/2017
JP   2007-176244 A    7/2007
(Continued)

*Primary Examiner* — Brian Wilson
(74) *Attorney, Agent, or Firm* — Young Basile Hanlon & MacFarlane, P.C.

(57) ABSTRACT

A parking assistance device includes: a surrounding-image generation circuit that generates a surrounding image that is a view of surroundings of a mobile object from above; an image display circuit that displays an assistance image at a position of an empty parking space in the surrounding image, the first assistance image indicating the empty parking space; and a turning determination circuit that determines whether the mobile object is turning. In a case where it is determined by the turning determination circuit that the mobile object is turning, the image display circuit prohibits the assistance image from being displayed.

9 Claims, 9 Drawing Sheets

(51) Int. Cl.
*G08G 1/056* (2006.01)
*G08G 1/14* (2006.01)

(52) U.S. Cl.
CPC ..... *B60R 2300/105* (2013.01); *B60R 2300/20* (2013.01); *B60R 2300/607* (2013.01); *B60R 2300/806* (2013.01)

(58) Field of Classification Search
CPC ........ B60R 2300/806; B60R 2300/304; B60R 2300/305; B60R 21/00; G06K 9/00812; G08G 1/143; G08G 1/056; G08G 1/168; B62D 15/0285
See application file for complete search history.

(56) References Cited

U.S. PATENT DOCUMENTS

2013/0060421 A1* 3/2013 Kadowaki ................. B60R 1/00
 701/36
2013/0144492 A1* 6/2013 Takano ............. B62D 15/0285
 701/42
2019/0001968 A1* 1/2019 Yorifuji ................ B62D 15/027

FOREIGN PATENT DOCUMENTS

| JP | 2008-096362 A | 4/2008 |
| JP | 2012-001144 A | 1/2012 |
| JP | 2014-125195 A | 7/2014 |
| JP | 2017-024596 A | 2/2017 |
| WO | 2017/068701 A1 | 4/2017 |

\* cited by examiner

PARKING ASSISTANCE METHOD AND PARKING ASSISTANCE DEVICE

TECHNICAL FIELD

The present invention relates to parking assistance methods and parking assistance devices.

BACKGROUND

There have been known inventions for assisting parking operation of the occupant (Japanese Patent Application Publication No. 2008-96362). In the invention disclosed in Japanese Patent Application Publication No. 2008-96362, an empty parking space is searched for while the vehicle is traveling. In the case where an empty parking space is detected, an image indicating the empty parking space is displayed on a display.

SUMMARY

Unfortunately, when a host vehicle is turning, the states of empty parking spaces around the host vehicle may be erroneously detected. Thus, there is a possibility of providing wrong information to the occupant of the host vehicle. The invention disclosed in Japanese Patent Application Publication No. 2008-96362 has no consideration at this point.

The present invention has been made in light of the above problem, and an object thereof is to provide a parking assistance method and parking assistance device capable of preventing wrong information from being provided to the occupant.

A parking assistance method according to an aspect of the present invention involves displaying an assistance image at a position of an empty parking space in a surrounding image that is a view of an area including a mobile object from above, the assistance image indicating the empty parking space. The parking assistance method includes: determining whether the mobile object is turning; and in a case where it is determined that the mobile object is turning, prohibiting the assistance image from being displayed.

The present invention makes it possible to prevent wrong information from being provided to the occupant.

DETAILED DESCRIPTION

Figure 1:
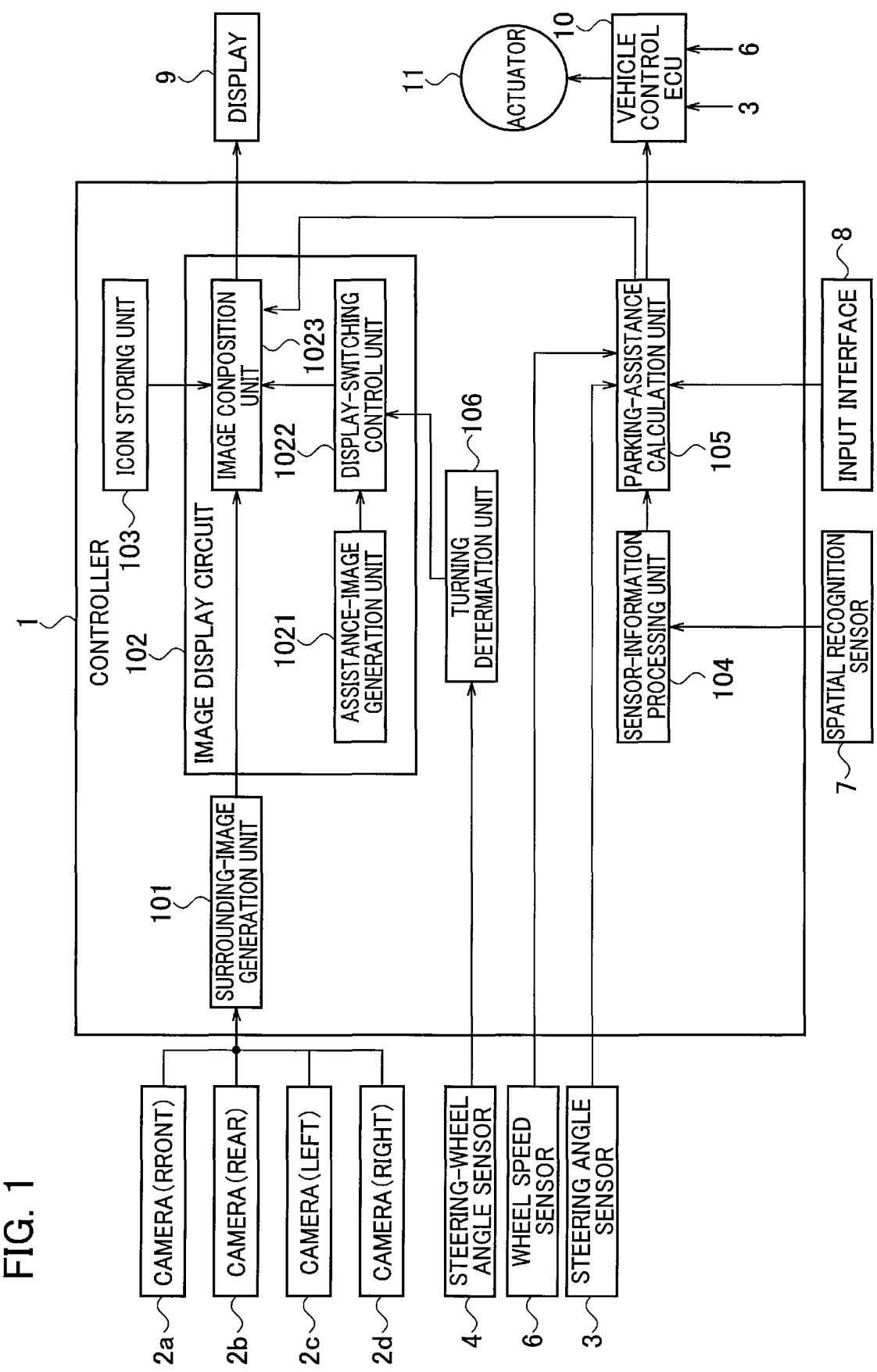
FIG. 1 is an overall configuration diagram a parking assistance device according to an embodiment of the present invention.

Hereinafter, an embodiment of the present invention will be described with reference to the drawings. The same constituents in the drawings are denoted by the same symbols, and description thereof is omitted. A parking assistance device according to the present embodiment is applied to a vehicle in which its driving mode can be switched between automated driving and manual driving, but the application is not limited to this example. The parking assistance device according to the present embodiment is also applicable to various mobile objects, such as, for example, industrial vehicles (for example, trucks), airplanes, aircraft, underwater mobile objects (for example, sea-bottom probes, submarines), machines with an inverted pendulum, and cleaning robots. Note that automated driving in the present embodiment means, for example, the state where at least one of the actuators including the brakes, accelerator, and steering is being controlled without operation by the driver. It means that the automated driving includes the state where at least one of the actuators is being controlled and the other actuators are being operated by the driver. Manual driving in the present embodiment means, for example, the state where the driver is performing necessary operation for traveling such as braking, acceleration, and steering.

(Configuration of Parking Assistance Device)

The configuration of a parking assistance device according to the present embodiment will be described with reference to FIG. 1. The parking assistance device includes a controller 1, cameras 2a to 2d, a steering angle sensor 3, a steering-wheel angle sensor 4, a wheel speed sensor 6, a spatial recognition sensor 7, an input interface 8, a display 9, a vehicle control ECU 10, and an actuator 11.

The cameras 2a to 2d each have an image capturing device, such as a charge-coupled device (CCD) or a complementary metal oxide semiconductor (CMOS) and capture images around the host vehicle. The camera 2a is mounted at a front portion of the host vehicle to capture images ahead of the host vehicle. The camera 2b is mounted at a rear portion of the host vehicle to capture images behind the host vehicle. The camera 2c is mounted at a left side of the host vehicle to capture images on the left side of the host vehicle. The camera 2d is mounted at a right side of the host vehicle to capture images on the right side of the host vehicle. Each camera is attached below the roof of the host vehicle.

Since each camera is located below the roof of the host vehicle, it is difficult to display an image actually captured from information on the host vehicle. In addition, since the tires of the host vehicle are housed in the wheel wells, it is difficult to capture images of the outer circle surfaces of the tires of the host vehicle (side surfaces, assuming that the tire is a cylinder). In other words, since it is difficult to capture images of the host vehicle and the tires of the host vehicle, it is difficult to obtain actual images of the host vehicle and the tires. For this reason, instead of an actual image of the host vehicle, an icon of the host vehicle (an image imitating the host vehicle) described later is used.

The steering angle sensor 3 detects the steering angle of the host vehicle when the host vehicle is operating to park into an empty parking space (or by the time when the host vehicle is parked into an empty parking space). When detecting the steering angle of the host vehicle, the steering angle sensor 3 may directly detect the orientations of tires of the host vehicle or may detect the steering angle from the angle of the steering wheel of the host vehicle. The steering angle sensor 3 outputs the detected steering angle to the controller 1. Note that the steering angle does not need to be detected all the time until parking operation is finished, the steering angle only needs to be calculated at timings set in advance.

The steering-wheel angle sensor 4 detects the steering-wheel angle (the angle of steering operation) of the host vehicle and outputs the detected steering-wheel angle to the controller 1. The wheel speed sensor 6 detects the speed of the host vehicle and outputs the detected speed to the controller 1.

The spatial recognition sensor 7 is a sensor for detecting objects around the host vehicle, which is, for example, a laser range finder. The laser range finder projects infrared laser light toward a target object and measures the distance to the target object using the intensity of the reflected light. The laser range finder obtains the measured distance as point cloud information and outputs the point cloud information to a sensor-information processing unit 104. Objects around the host vehicle mean moving objects including other vehicles, motorbikes, bicycles, and pedestrians and stationary objects including parked vehicles. Note that the spatial recognition sensor 7 is not limited to a laser range finder. The spatial recognition sensor 7 only needs to detect the distance to a target object and the presence of the target object, and hence the spatial recognition sensor 7 may be, for example, a clearance sonar utilizing ultrasonic, a monocular camera, or a stereo camera having a pair of cameras.

The input interface 8 is a device that receives input from the occupant of the host vehicle. The input interface 8 is, for example, a touch panel provided on the display 9. Note that the input interface 8 may be a joystick or an operation switch or may be a voice input device.

The controller 1 is circuitry that processes data obtained from various sensors and is, for example, a general-purpose microcomputer including a central processing unit (CPU), memory, and an input-output unit. A computer program that causes the microcomputer to function as the controller 1 is installed in and executed by the microcomputer. This makes the microcomputer function as the controller 1. Note that although here, description is made of an example in which the controller 1 is implemented by software, dedicated hardware for executing information processes described below, as a matter of course, may be used to configure the controller 1. The controller 1 includes multiple information process circuits, which are a surrounding-image generation unit 101, an image display circuit 102, an icon storing unit 103, the sensor-information processing unit 104, a parking-assistance calculation unit 105, and a turning determination unit 106. The image display circuit 102 includes an assistance-image generation unit 1021, a display-switching control unit 1022, and an image composition unit 1023.

The surrounding-image generation unit 101 (surrounding-image generation circuit) sets a predetermined virtual eye-point and picture plane based on images of surroundings of the host vehicle captured by the four cameras 2a to 2d and generates an image (downward view image) that looks as if the host vehicle is looked down from above (toward the vehicle). Since how to generate the downward view image is a known technique, detailed description thereof is omitted. Note that in the present embodiment, the image described above does not need to be a downward view image, but it may be any image (surrounding image) that shows the surroundings of the host vehicle, such as a bird's view image. Note that besides the cameras of the host vehicle, the surrounding-image generation unit 101 may receive images captured by cameras provided in a parking lot or cameras mounted on another vehicle via wireless communication and generate a downward view image (surrounding image). Note that in the present embodiment, in the case where an image captured from above the host vehicle is used, it is not necessary to use an image imitating the host vehicle (a vehicle icon).

The sensor-information processing unit 104 estimates a travel path along which the host vehicle is to travel, using information obtained from the spatial recognition sensor 7. The sensor-information processing unit 104 estimates a parking area (parking spot) in the vicinities of the estimated travel path. The sensor-information processing unit 104 estimates the range in which the host vehicle can travel based on the estimated travel path and parking spots. The sensor-information processing unit 104 may detect parking spots using white lines on the ground.

The turning determination unit 106 (turning determination circuit) determines whether the host vehicle is turning, using the steering-wheel angle obtained from the steering-wheel angle sensor 4. The turning determination unit 106 outputs the determination result to the display-switching control unit 1022.

The assistance-image generation unit 1021 generates assistance images for assisting parking. Note that the assistance images may be stored in the icon storing unit 103 in advance. In the case where the assistance images are stored in the icon storing unit 103, the assistance-image generation unit 1021 can read the assistance images from the icon storing unit 103. The assistance-image generation unit 1021 outputs the generated assistance images to the display-switching control unit 1022.

The display-switching control unit 1022 determines whether to output an assistance image obtained from the assistance-image generation unit 1021 to the image composition unit 1023, based on the determination result made by the turning determination unit 106. For example, in the case where the steering-wheel angle is larger than or equal to ±180 degrees, the display-switching control unit 1022 outputs the assistance image to the image composition unit 1023. Details will be described later.

The image composition unit 1023 superimposes the icon (an image imitating the host vehicle) obtained from the icon storing unit 103 on the downward view image generated by surrounding-image generation unit 101 to generate a composite image. In the case where the image composition unit 1023 obtains an assistance image from the display-switching control unit 1022, the image composition unit 1023 superimposes this assistance image on the downward view image. The image composition unit 1023 outputs the composed image to the display 9.

The parking-assistance calculation unit 105 calculates a control signal for the host vehicle based on information inputted to the input interface 8, data obtained by the sensor-information processing unit 104, the steering angle detected by the steering angle sensor 3, and the speed detected by the wheel speed sensor 6. The parking-assistance calculation unit 105 outputs the calculated control signal to the vehicle control ECU10.

The vehicle control ECU10 automatically controls driving of the actuator 11 on driving, braking, and steering the host vehicle, based on the control signal and the like obtained from the parking-assistance calculation unit 105.

The display 9 is a device for displaying various kinds of information for the occupant, which is, for example, a display for navigation provided in the passenger compartment.

Figure 2:
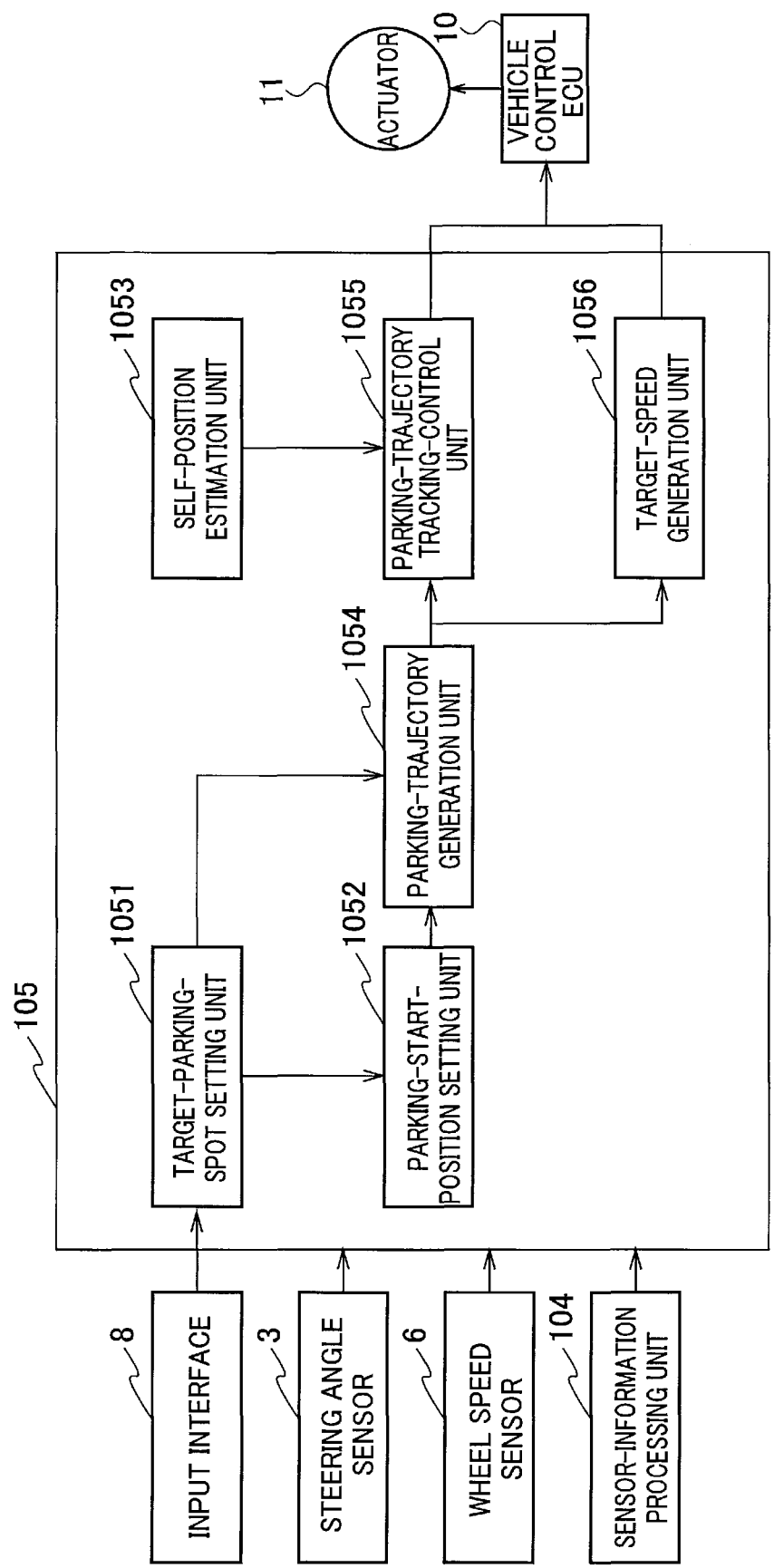
FIG. 2 is a configuration diagram of part of the parking assistance device according to the embodiment of the present invention.

Next, the parking-assistance calculation unit 105 will be described in detail with reference to FIG. 2. As illustrated in FIG. 2, the parking-assistance calculation unit 105 includes a target-parking-spot setting unit 1051, parking-start-position setting unit 1052, self-position estimation unit 1053, parking-trajectory generation unit 1054, parking-trajectory tracking-control unit 1055, and target-speed generation unit 1056.

The target-parking-spot setting unit 1051 sets the target parking position to a parking position that the occupant input to the input interface 8. The target-parking-spot setting unit 1051 outputs the set target parking position to the parking-start-position setting unit 1052 and the parking-trajectory generation unit 1054.

The parking-start-position setting unit 1052 determines a parking method suitable for parking at the target parking position and sets a parking start position suitable for the determined parking method. Examples of the parking method include parallel parking and perpendicular parking. The parking-start-position setting unit 1052 outputs the set parking start position to the parking-trajectory generation unit 1054.

The self-position estimation unit 1053 estimates the current position of the host vehicle, based on detection data and the like of the wheel speed sensor 6 and steering angle sensor 3. For a front-wheel-steering vehicle traveling at a very low speed, it is common to use a dead reckoning approach in which the position and orientation of the host vehicle are estimated based on the relationship between the travel distance of the center of the rear wheel axle and the front-wheel steering angle. The dead reckoning approach is useful for the case of considering traveling in a limited section such as parking operation. As another example, the self-position estimation unit 1053 can also estimate the self-position based on the positional relationship of the host vehicle relative to detection data detected by the spatial recognition sensor 7, the positional relationship of the host vehicle relative to white lines on the ground captured by the cameras 2a to 2d and object recognition results, or the like. Alternatively, the self-position estimation unit 1053 may estimate the absolute position of the host vehicle, in other words, the position of the host vehicle relative to a specified reference point, using a position detection sensor. The position detection sensor is a device mounted on the host vehicle for measuring the absolute position of the host vehicle using a global positioning system (GPS), odometry, or the like. The self-position estimation unit 1053 outputs the estimated self-position to the parking-trajectory tracking-control unit 1055.

The parking-trajectory generation unit 1054 generates a parking trajectory from the parking start position set by the parking-start-position setting unit 1052 to the target parking position. The parking-trajectory generation unit 1054 generates a parking trajectory, for example, such that the number of forward and backward movements and the amount of steering are minimized, so that the occupant does not feel discomfort. The parking-trajectory generation unit 1054 outputs the generated parking trajectory to the parking-trajectory tracking-control unit 1055 and the target-speed generation unit 1056.

The parking-trajectory tracking-control unit 1055 generates a control signal for performing automatic parking control along the parking trajectory, based on the parking trajectory generated by the parking-trajectory generation unit 1054 and the self-position estimated by the self-position estimation unit 1053. For example, the parking-trajectory tracking-control unit 1055 generates a control signal related to the steering angle and the shift position. The parking-trajectory tracking-control unit 1055 outputs the generated control signal to the vehicle control ECU10.

The target-speed generation unit 1056 generates a control signal for performing automatic parking control along the parking trajectory generated by the parking-trajectory generation unit 1054. For example, the target-speed generation unit 1056 generates a control signal related to the speed (the amount of acceleration and the amount of braking). The target-speed generation unit 1056 outputs the generated control signal to the vehicle control ECU10.

The vehicle control ECU10 controls the actuator 11 based on the control signals generated by the parking-trajectory tracking-control unit 1055 and the target-speed generation unit 1056 to achieve automatic parking control.

(Operation Example of Parking Assistance Device)

Next, an operation example of a parking assistance device will be described with reference to FIGS. 3 to 4.

Figure 3:
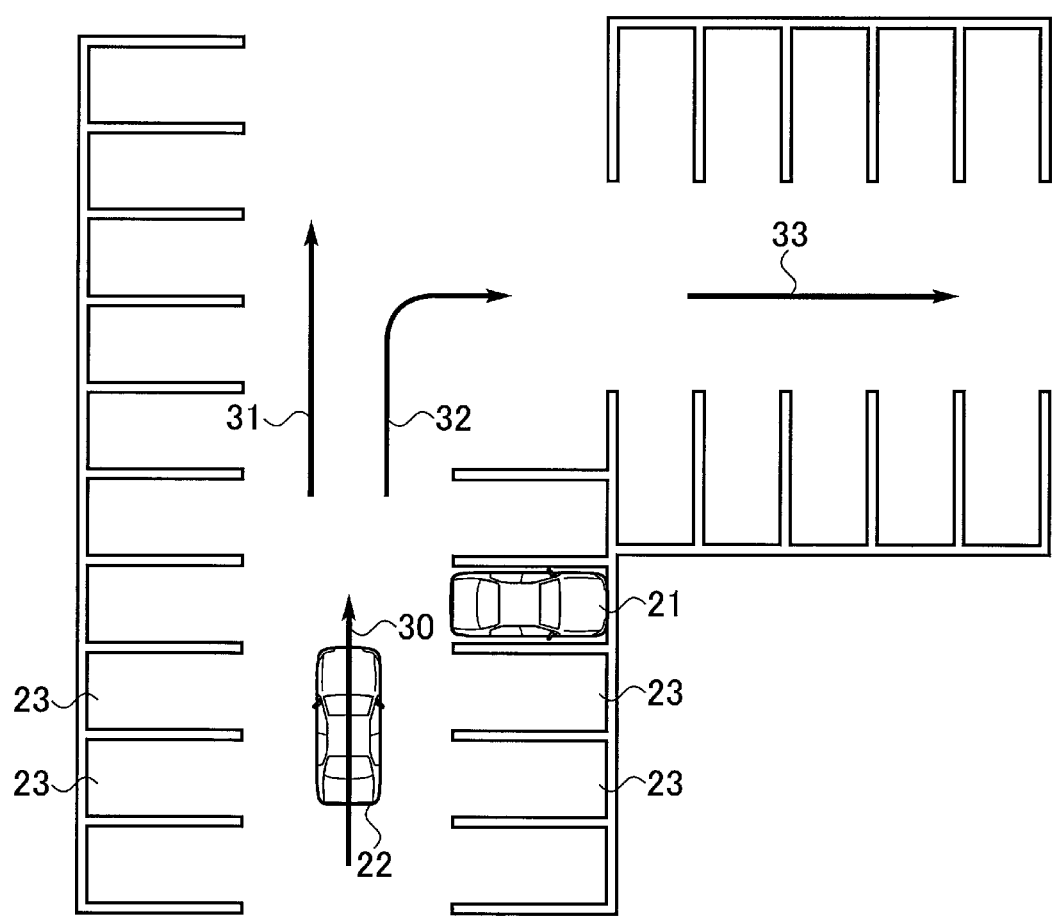
FIG. 3 illustrates a travel scene for explaining an operation example of the parking assistance device according to the embodiment of the present invention.

In the scene illustrated in FIG. 3, the host vehicle 22 is traveling in a parking lot while searching for an empty parking space 23. Road markings 30, 31, 32, and 33 illustrated in FIG. 3 are road markings provided on the ground. The road markings 30, 31, and 33 show that the vehicle is allowed to travel straight. The road marking 32 shows that the vehicle is allowed to turn right. Another vehicle 21 illustrated in FIG. 3 is a parked vehicle. Note that in the present embodiment, the time when the host vehicle 22 is traveling in the parking lot means the time when the host vehicle 22 is traveling on a road adjoining empty parking spaces. On the other hand, the time when the host vehicle 22 is parked in an empty parking space is the time when the host vehicle 22 is at a standstill in a parking space, which is different from the time when traveling in a parking lot. In addition, the time when the host vehicle 22 is traveling in a parking lot in the present embodiment may include the time when traveling on empty parking spaces. When the host vehicle 22 is traveling in a parking lot, in the case where the road adjoining to an empty parking space is narrow or where the host vehicle 22 and another vehicle pass by each other, there is a case where the host vehicle 22 travels on empty parking spaces.

Figure 4:
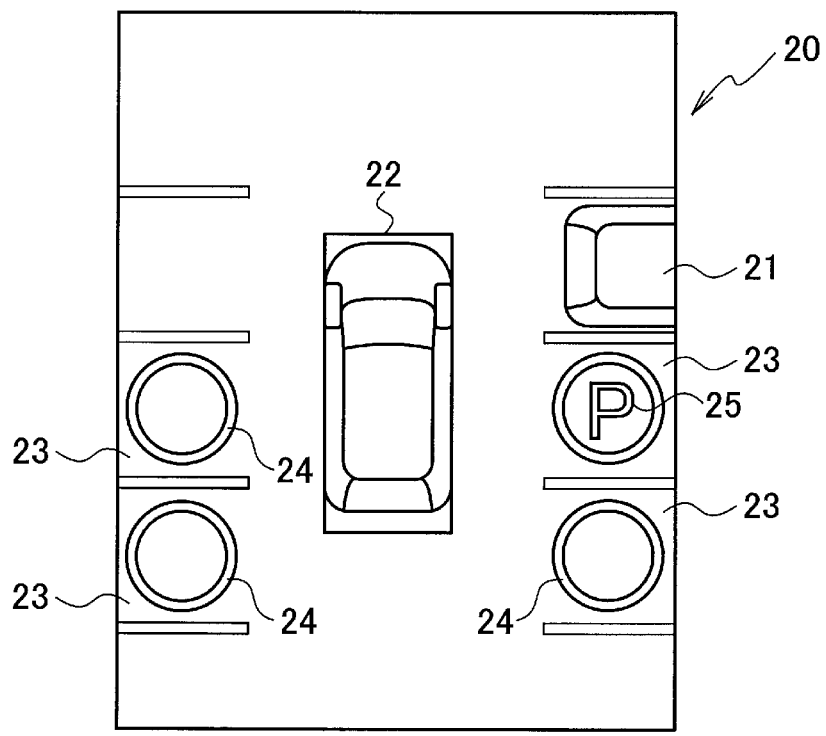
FIG. 4 is a diagram for explaining the operation example of the parking assistance device according to the embodiment of the present invention.

FIG. 4 illustrates a downward view image 20 which is a view of the host vehicle 22 looked down from above in the scene illustrated in FIG. 3. In the case where the sensor-information processing unit 104 has detected empty parking spaces 23 around the host vehicle 22 as illustrated in FIG. 4, the turning determination unit 106 determines whether the host vehicle 22 is turning. For example, when the steering-wheel angle is larger than or equal to ±180 degrees, the turning determination unit 106 determines that the host vehicle 22 is turning. When the steering-wheel angle is smaller than ±180 degrees, the turning determination unit 106 determines that the host vehicle 22 is not turning. Note that in the case where the host vehicle 22 is not turning in the present embodiment, the host vehicle 22 is traveling straight.

As illustrated in FIG. 4, when the turning determination unit 106 determines that the host vehicle 22 is not turning, in other words, when the turning determination unit 106 determines that the host vehicle 22 is traveling straight, the image composition unit 1023 displays assistance images 24 and 25 (first assistance images) at empty parking spaces 23. Also, when the turning determination unit 106 determines that the state of the host vehicle 22 has changed from turning to traveling straight, the image composition unit 1023 displays the assistance images 24 and 25 (the first assistance image) at empty parking spaces 23. The assistance images 24 and 25 are images indicating that the parking space is empty. The assistance image 25 shows that the parking space is empty and also that this place is a recommended parking space. The recommended parking space means, for example, a space that is easy to park in. The recommended parking space may be a space that requires a shorter time to park there or may be a space the parking trajectory to which is short. In addition, the recommended parking space may also be a space the parking trajectory to which includes no sharp turn, a space into which reverse parking is possible, or a space that is easy to exit from. The assistance image 24 only indicates that the parking space is empty.

Since the assistance images 24 and 25 are displayed at the empty parking spaces 23 as described above while the host vehicle 22 is traveling straight, the occupant can easily understand that the empty parking spaces 23 are empty. This allows the occupant to take actions to park in a desired empty parking space. For example, in the case where automatic parking control is available as in the present embodiment, the occupant's touch on the assistance image 25 (recommended parking space) initiates automatic parking control to the target parking position.

Next, another operation example of the parking assistance device will be described with reference to FIGS. 5 to 6.

Figure 5:
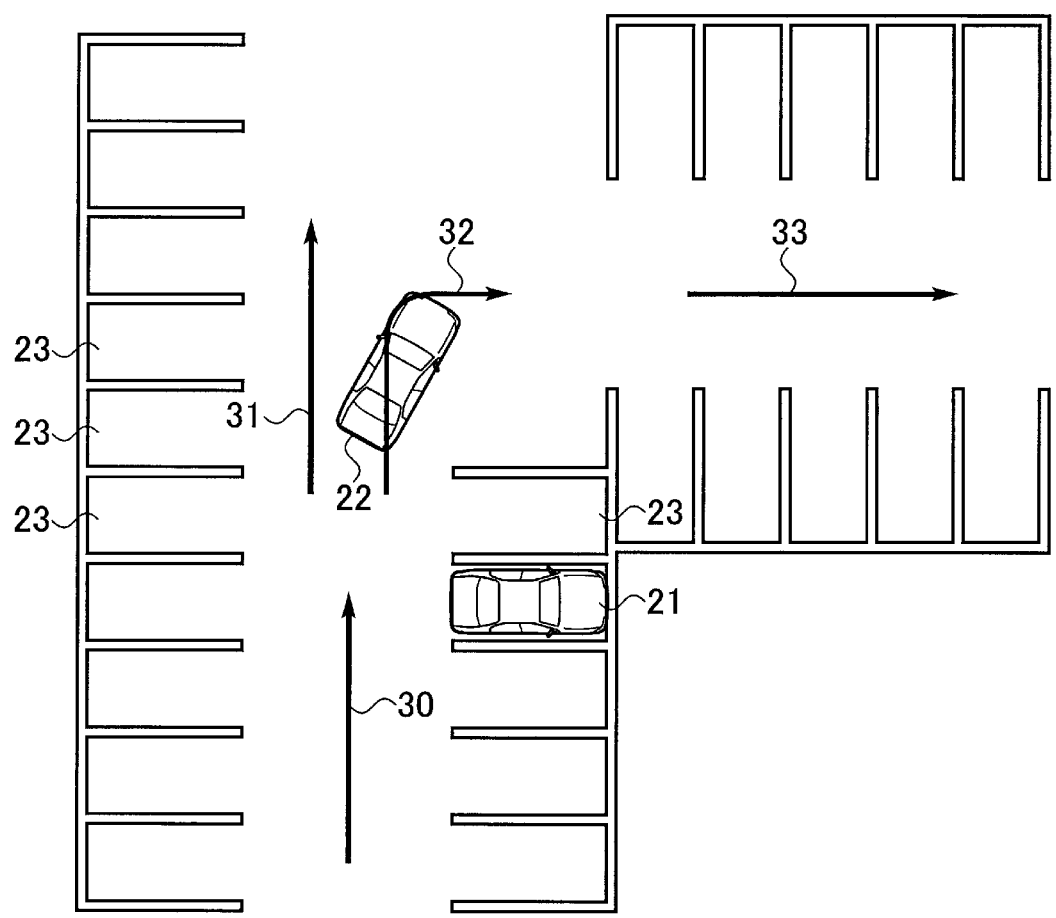
FIG. 5 illustrates a travel scene for explaining a different operation example of the parking assistance device according to the embodiment of the present invention.

In the scene illustrated in FIG. 5, the host vehicle 22 has traveled forward a little from the scene illustrated in FIG. 3. In the scene illustrated in FIG. 5, it is assumed that the host vehicle 22 is turning right and that the steering-wheel angle is larger than or equal to 180 degrees in the clockwise direction.

Figure 6:
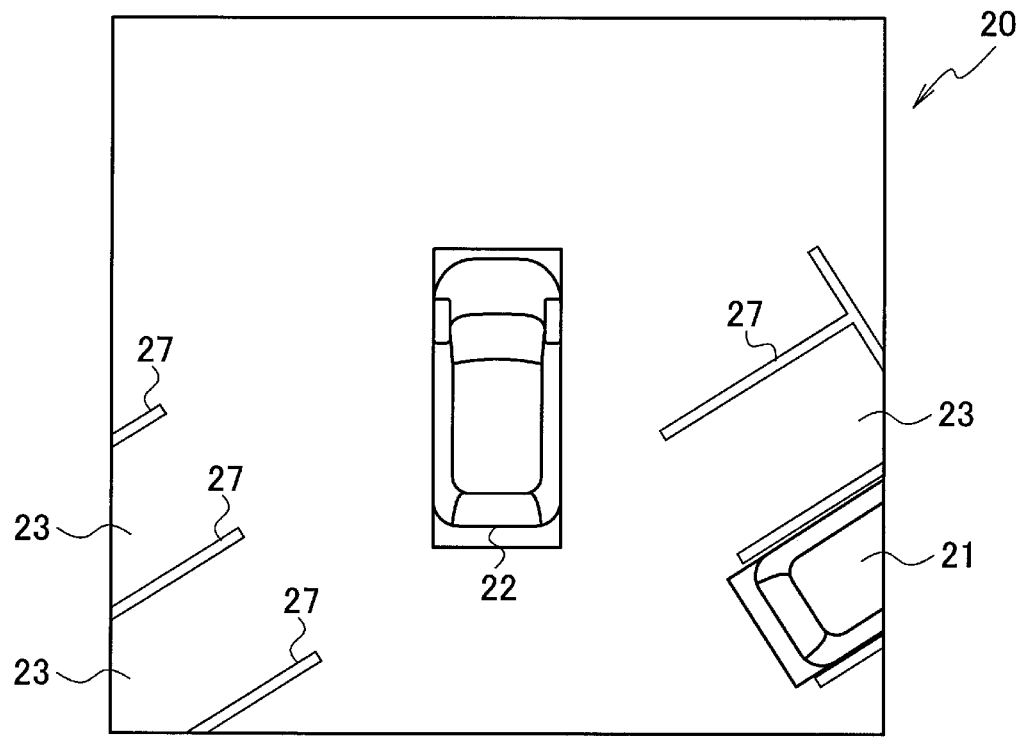
FIG. 6 is a diagram for explaining the different operation example of the parking assistance device according to the embodiment of the present invention.

The downward view image 20 corresponding to the scene illustrated in FIG. 5 is illustrated in FIG. 6. In the case where the sensor-information processing unit 104 detects empty parking spaces 23 around the host vehicle 22 as illustrated in FIG. 6, the turning determination unit 106 determines whether the host vehicle 22 is turning.

As illustrated in FIG. 6, when the turning determination unit 106 determines that the host vehicle 22 is turning, the image composition unit 1023 does not display the assistance image 24 or assistance image 25 illustrated in FIG. 4 on the downward view image 20. In other words, when the host vehicle 22 is turning, the image composition unit 1023 prohibits the assistance image 24 or the assistance image 25 from being displayed. The reason is that when the host vehicle 22 is turning, the sensor-information processing unit 104 may erroneously detect the states of empty parking spaces 23. The erroneous detection of the state of an empty parking space 23 means, for example, detecting a space that is not an empty parking space 23, as an empty parking space. When the host vehicle 22 is turning, for example, the motion of a camera positioned far from the turning center is faster than the motion of a camera positioned near the turning center. Thus, the accuracy of a camera positioned far from the turning center may be low. For this reason, a camera positioned far from the turning center may erroneously detect the state of an empty parking space 23. In addition, when the host vehicle 22 is turning, an object (including a parking space) nearer to the host vehicle 22 moves faster on an image, making it difficult to detect the object using an image. Thus, in the case where cameras are used as the sensor-information processing unit 104, the sensor-information processing unit 104 may erroneously detect the state of an empty parking space 23. This is also a reason of the prohibition. In addition, in the case where cameras are used as the sensor-information processing unit 104, the farther from the host vehicle 22 an object is, the poorer the resolution of the object is. Thus, it is difficult to detect an object far from the host vehicle 22, and it is more difficult to detect an object far from the host vehicle 22, moving on an image while the host vehicle 22 is turning. For these reasons, the image composition unit 1023 prohibits the assistance image 24 or the assistance image 25 from being displayed when the host vehicle 22 is turning.

In addition, since the accuracy of a camera positioned far from the turning center is low, the positional deviation of the assistance images 24 and 25 may be large when they are displayed. When the image composition unit 1023 displays the assistance images 24 and 25 at the empty parking spaces 23, first the image composition unit 1023 recognizes the empty parking spaces 23 in the downward view image 20. Next, the image composition unit 1023 displays the assistance images 24 and 25 at the recognized empty parking spaces 23. If the host vehicle 22 moves when the image composition unit 1023 performs the processing above, the empty parking spaces 23 recognized by the image composition unit 1023 in the downward view image 20 also move. Specifically, the image composition unit 1023 recognizes the empty parking spaces 23, and at the next moment when the image composition unit 1023 is about to display the assistance images 24 and 25 at the recognized empty parking spaces 23, the recognized empty parking spaces 23 move. In this way, a time lag occurs between the time when the image composition unit 1023 recognizes the empty parking spaces 23 and the time when the image composition unit 1023 displays the assistance images 24 and 25 at the recognized empty parking spaces 23. This time lag may cause positional deviation between the positions of the empty parking spaces 23 and the positions of the assistance images 24 and 25. When the host vehicle 22 is turning, there is a case where the positional deviation in the display is large because the accuracy of a camera positioned far from the turning center is low. This makes it difficult for the image composition unit 1023 to display the assistance images 24 and 25 at appropriate positions. In addition, since the accuracy of a camera positioned far from the turning center is low when the host vehicle 22 is turning, the road marking 31 and the road marking 32 illustrated in FIG. 5 may be erroneously detected as markings of parking spots.

Since the sensor-information processing unit 104 may erroneously detect the states of the empty parking spaces 23 as above when the host vehicle 22 is turning, the image composition unit 1023 prohibits the assistance images 24 and 25 from being displayed at the empty parking spaces 23. This prevents the image composition unit 1023 from providing wrong information to the occupant. Note that although in the example illustrated in FIG. 6, description has been made of prohibiting the assistance images 24 and 25 from being displayed, the present invention is not limited to this operation. For example, when the host vehicle 22 is turning, the image composition unit 1023 may prohibit marking of parking spots 27 illustrated in FIG. 6 from being displayed.

Next, another operation example of the parking assistance device will be described with reference to FIG. 7.

Figure 7:
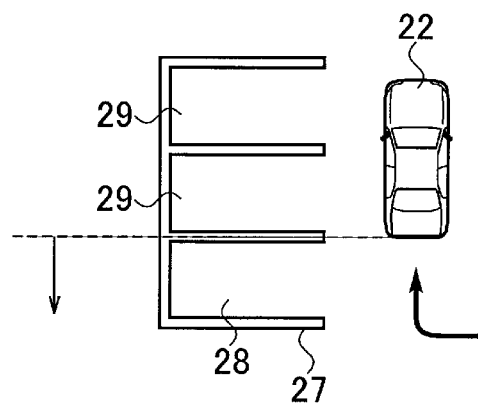
FIG. 7 is a travel scene for explaining a further different operation example of the parking assistance device according to the embodiment of the present invention.

The scene illustrated in FIG. 7 is a scene in which the state of the host vehicle 22 has just changed from turning to traveling straight. When the state of the host vehicle 22 has just changed from turning to traveling straight, the image composition unit 1023 prohibits the assistance images 24 and 25 from being displayed at an empty parking space 28 positioned behind the host vehicle 22. This is because the empty parking space 28 can be a result of erroneous detection because the empty parking space 28 is an empty parking space detected when the host vehicle 22 was turning. On the other hand, for the empty parking spaces 29 detected when the host vehicle 22 was traveling straight, the image composition unit 1023 displays the assistance images 24 and 25.

Although in the above operation example, two types of empty parking space, the recommended parking space and the merely empty parking space, have been taken and described as examples, the type of empty parking space is not limited to these types. The empty parking spaces may include the empty parking space that meets parking conditions inputted by the occupant in advance. Hereinafter, an empty parking space that meets parking conditions inputted by the occupant in advance is simply referred to as a parking target. The types of empty parking space can be categorized depending on whether a parking space meets a specified condition. For example, if a parking space meets the condition that it is empty, the parking space is regarded as an empty parking space. If a parking space meets the condition for being recommended, the parking space is regarded as a recommended parking space. If a parking space meets a parking condition inputted by the occupant in advance, the parking space is regarded as a parking target. In the case where the host vehicle 22 has detected a parking target, the image composition unit 1023 displays an assistance image at the parking target, and the assistance image displayed in this case should preferably be an assistance image different from the assistance image 24 or the assistance image 25. As a matter of course, the assistance image displayed at a parking target may be the assistance image 24 or the assistance image 25.

Although in the above operation example, the image composition unit 1023 prohibits the assistance images 24 and 25 from being displayed at empty parking spaces when the host vehicle 22 is turning, the present invention is not limited to this operation. The image composition unit 1023 may prohibit the assistance images 24 and 25 from being displayed depending on the type of empty parking space. In other words, the image composition unit 1023 may display the assistance images 24 and 25 depending on the type of empty parking space. For example, in the case where a parking target and a merely empty parking space are detected when the host vehicle 22 is turning, the image composition unit 1023 may prohibit an assistance image from being displayed at the parking target and may display an assistance image 24 at the merely empty parking space. Since the parking target is a parking space preferred to the occupant, the image composition unit 1023 only prohibits an assistance image from being displayed at the parking target, so that it is possible to prevent wrong information from being provided to the occupant. In the case where a parking target, a recommended parking space, and a merely empty parking space are detected when the host vehicle 22 is turning, the image composition unit 1023 may only prohibit an assistance image from being displayed at the parking target and may display the assistance image 25 at the recommended parking space and display the assistance image 24 at the merely empty parking space.

Figure 8A:
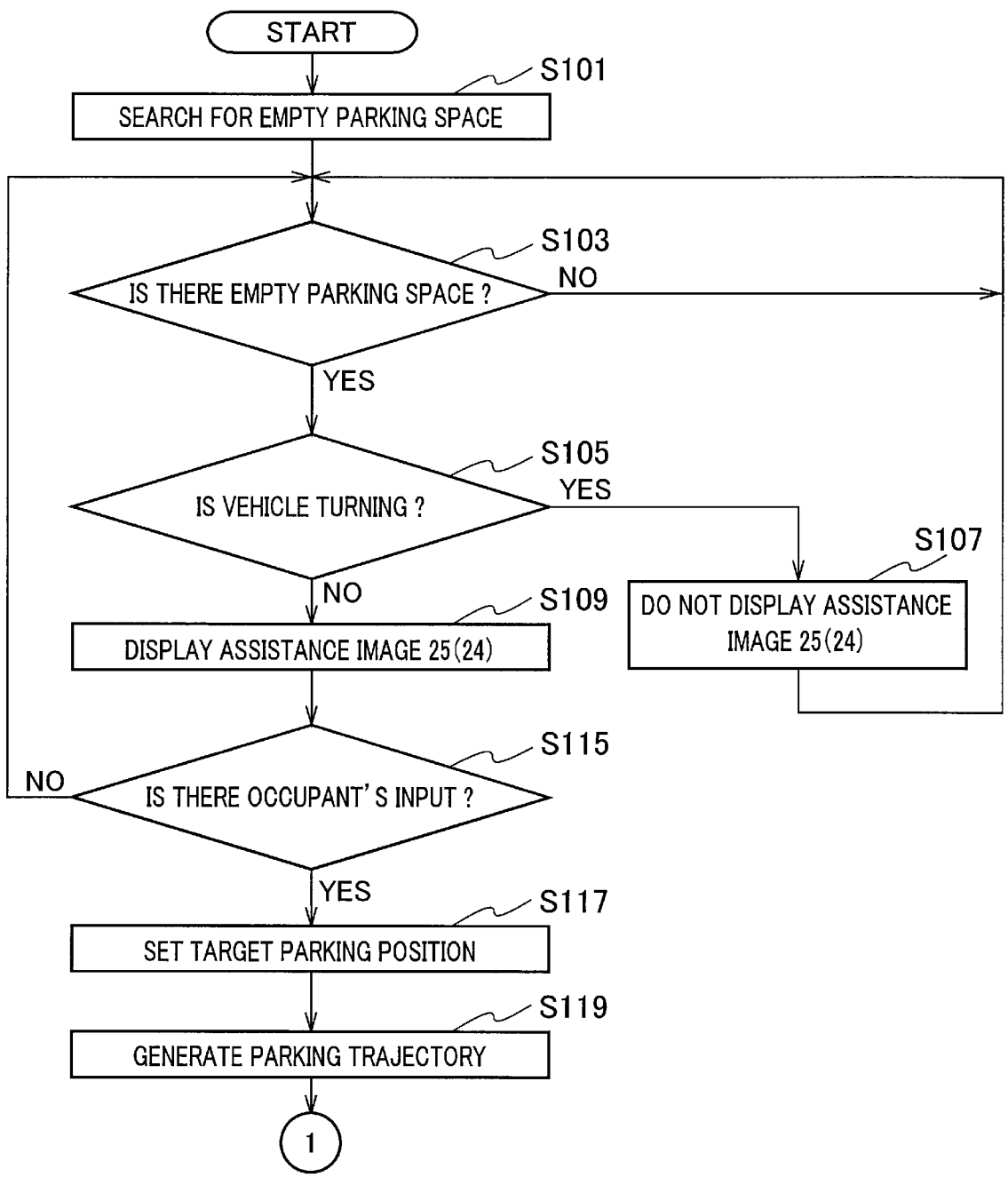
FIG. 8A is a flowchart for explaining an operation example of the parking assistance device according to the embodiment of the present invention.
Figure 8B:
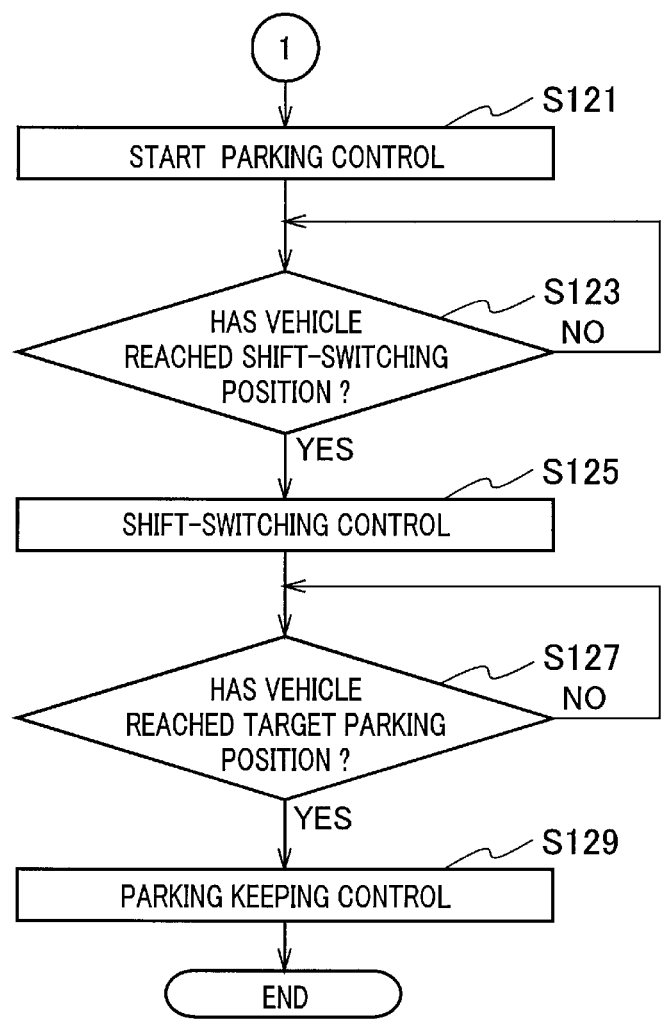
FIG. 8B is a flowchart for explaining the operation example of the parking assistance device according to the embodiment of the present invention.

Next, an operation example of the parking assistance device will be described with reference to flowcharts of FIGS. 8A and 8B.

At step S101, the sensor-information processing unit 104 searches for empty parking spaces based on information obtained from the spatial recognition sensor 7. The process proceeds to step S103, at which if the sensor-information processing unit 104 detects an empty parking space around the host vehicle 22 (Yes at step S103), the process proceeds to step S105. At step S103, if the sensor-information processing unit 104 does not detect an empty parking space around the host vehicle 22 (No at step S103), the process keeps waiting.

At step S105, the turning determination unit 106 determines whether the host vehicle 22 is turning. For example, in the case where the steering-wheel angle is larger than or equal to ±180 degrees, the turning determination unit 106 determines that the host vehicle 22 is turning. If the turning determination unit 106 determines that the host vehicle 22 is turning (Yes at step S105), the process proceeds to step S107, where the image composition unit 1023 does not display the assistance image 24 or 25 at empty parking spaces 23. The reason is that the sensor-information processing unit 104 may erroneously detect the states of empty parking spaces 23 when the host vehicle 22 is turning.

On the other hand, if the turning determination unit 106 determines that the host vehicle 22 is traveling straight (No at step S105), the process proceeds to step S109, where the image composition unit 1023 displays the assistance images 24 and 25 at empty parking spaces 23 as illustrated in FIG. 4. This makes it easy for the occupant to understand that the empty parking spaces 23 are empty.

The process proceeds to step S115, where if the occupant selects a desired empty parking space via the input interface 8 (Yes at step S115), the process proceeds to step S117. On the other hand, if there is no input from the occupant, the process returns to step S103.

At step S117, the target-parking-spot setting unit 1051 sets the target parking position to the empty parking space selected by the occupant. The parking-start-position setting unit 1052 determines the parking method and sets a parking start position suitable for the determined parking method. Note that in this flowchart, description is made assuming that the parking method is reverse parking. After that, the process proceeds to step S119, where the parking-trajectory generation unit 1054 generates a parking trajectory from the parking start position set at step S117 to the target parking position. Next, the process proceeds to step S121, where the vehicle control ECU10 starts the automatic parking control.

Next, the process proceeds to step S123, where the self-position estimation unit 1053 determines whether the host vehicle 22 has reached the position at which the shift position is to be switched. If the host vehicle 22 has reached the position at which the shift position is to be switched (Yes at step S123), the process proceeds to step S125, where the vehicle control ECU10 performs shift switching control. After that, the vehicle control ECU10 continues the automatic parking control, and the process proceeds to step S127. On the other hand, if the host vehicle 22 has not reached the position at which the shift position is to be switched (No at step S123), the process keeps waiting. At step S127, the self-position estimation unit 1053 determines whether the host vehicle 22 has reached the target parking position. If the host vehicle 22 has reached the target parking position (Yes at step S127), the process proceeds to step S129, where the vehicle control ECU10 performs control such as changing the shift position to the parking position, and then the automatic parking control ends.

(Operational Advantage)

As has been described above, the parking assistance device according to the present embodiment provides the following operational advantages.

When the sensor-information processing unit 104 detects an empty parking space 23 around the host vehicle 22, the turning determination unit 106 determines whether the host vehicle 22 is turning. In the case where the turning determination unit 106 determines that the host vehicle 22 is turning, the image composition unit 1023 prohibits the assistance images 24 and 25 from being displayed at empty parking spaces 23 in the downward view image 20 as illustrated in FIG. 6. This prevents the parking assistance device from providing wrong information to the occupant even if the sensor-information processing unit 104 erroneously detects the states of empty parking spaces 23.

In the case where the state of the host vehicle 22 has switched from turning to traveling straight, the assistance images 24 and 25 are displayed at the positions of empty parking spaces. Since it is possible to provide the assistance images to the occupant in the state where it is unlikely to provide wrong information to the occupant, the occupant can understand the states of the parking spaces accurately.

In the case where the state of the host vehicle 22 has changed from turning to traveling straight as illustrated in FIG. 7, the image composition unit 1023 prohibits the assistance images 24 and 25 from being displayed at the empty parking space 28 which is positioned behind the host vehicle 22 just after the state change. This prevents the parking assistance device from providing wrong information to the occupant even when the sensor-information processing unit 104 erroneously detects the state of the empty parking space 28.

In the case where the turning angle of the host vehicle 22 is larger than or equal to a specified value, the turning determination unit 106 determines that the host vehicle 22 is turning. Since the image composition unit 1023 prohibits the assistance images 24 and 25 from being displayed in the case where the turning angle of the host vehicle 22 is larger than or equal to a specified value, it is possible to prevent the parking assistance device from providing wrong information to the occupant. Note that the turning angle of the host vehicle 22 may be determined from the steering-wheel angle or the steering angle.

Other Embodiments

Although an embodiment of the present invention has been described as above, it should not be understood that the descriptions and drawings constituting part of this disclosure limit this invention. From this disclosure, various alternative embodiments, examples, and operational techniques will be apparent to those skilled in the art.

Figure 9:
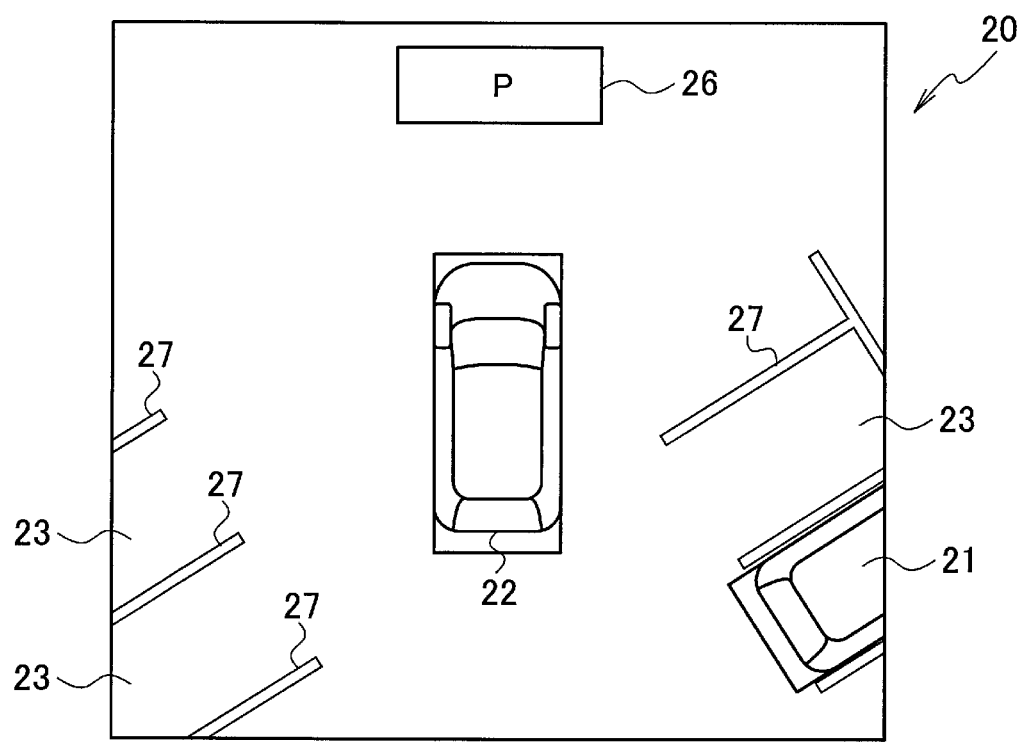
FIG. 9 is a diagram for explaining a further different operation example of the parking assistance device according to the embodiment of the present invention.

Although in the present embodiment, the image composition unit 1023 prohibits the assistance images 24 and 25 from being displayed at empty parking spaces 23 when the host vehicle 22 is turning, the image composition unit 1023 may display, for example, an assistance image 26 (second assistance image) at a certain position different from the position of the empty parking space 23, as illustrated in FIG. 9. The assistance image 26 is an image for indicating that an empty parking space 23 has been detected around the host vehicle 22. Because the assistance image 26 is not an image indicating an empty parking space 23 itself, the assistance image 26 is displayed at a position different from that of the empty parking space 23. Displaying the assistance image 26 at a position different from that of the empty parking space 23 enables the occupant to easily understand, by seeing the assistance image 26, that there is an empty parking space 23.

When the state of the host vehicle 22 has changed from turning to traveling straight, the image composition unit 1023 deletes the assistance image 26. As has been already described above, in the case where empty parking spaces have been detected when the host vehicle 22 is traveling straight, the image composition unit 1023 displays the assistance images 24 and 25 at empty parking spaces. Hence, when the host vehicle 22 is traveling straight, the assistance image 26 is not necessary. Accordingly, when the state of the host vehicle 22 has changed from turning to traveling straight, the image composition unit 1023 deletes the assistance image 26. Although in the present embodiment, the assistance image 26 illustrated in FIG. 9 is represented in a quadrangle shape, and the assistance images 24 and 25 illustrated in FIG. 4 are each represented in a round shape, the shapes are not limited to these examples. The assistance image 26 and the assistance images 24 and 25 may have any shape that can be distinguished one from the others. Note that the image composition unit 1023 may make the color of the assistance image 26 fainter (for example, gray), instead of deleting the assistance image 26.

As an alternative, the turning determination unit 106 may determine whether the host vehicle 22 is turning, based on to the steering-wheel angle and the speed. For example, the turning determination unit 106 may determine that the host vehicle 22 is turning in the case where the steering-wheel angle is larger than or equal to ±180 degrees and where the speed of the host vehicle 22 is larger than or equal to 3 km/h. In this way, the image composition unit 1023 prohibiting the assistance images 24 and 25 from being displayed in the case where the steering-wheel angle of the host vehicle 22 is larger than or equal to a specified value and where the speed of the host vehicle 22 is larger than or equal to a specified value (second specified value) prevents the parking assistance device from providing wrong information to the occupant. Even if the steering-wheel angle is larger than or equal to ±180 degrees, if the speed of the host vehicle 22 is lower than 3 km/h, the turning determination unit 106 may determine that the host vehicle 22 is not turning. In the case where the steering-wheel angle is smaller than ±180 degrees, the turning determination unit 106 may determines that the host vehicle 22 is not turning, regardless of the speed of the host vehicle 22. Note that the numerical values of ±180 degrees and 3 km/h are mere examples. Thus, the present invention is not limited to these values, but the values can be changed as appropriate.

Note that in the present embodiment, the driving mode at the time when the sensor-information processing unit 104 searches for an empty parking space may be either manual driving by the occupant or automated driving.

REFERENCE SIGNS LIST 1 controller
2a to 2d camera
3 steering angle sensor
4 steering-wheel angle sensor
6 wheel speed sensor
7 spatial recognition sensor
8 input interface
9 display
11 actuator 101 surrounding-image generation unit
102 image display circuit
103 icon storing unit
104 sensor-information processing unit
105 parking-assistance calculation unit
106 turning determination unit
1021 assistance-image generation unit
1022 display-switching control unit
1023 image composition unit

The invention claimed is:

1. A parking assistance method for a parking assistance device that searches for an empty parking space that meets a specified condition around a mobile object and displays a first assistance image at a position of the empty parking space in a surrounding image that is a view of an area including the mobile object from above, the first assistance image indicating the empty parking space, the parking assistance method comprising:
   determining whether the mobile object is turning; and
   in a case where it is determined that the mobile object is turning, maintaining displaying the surrounding image and prohibiting the first assistance image in the surrounding image from being displayed.

2. The parking assistance method according to claim 1, further comprising:
   in a case where a state of the mobile object has changed from turning to traveling straight, displaying the first assistance image at the position of the empty parking space.

3. The parking assistance method according to claim 1, further comprising:
   in a case where a state of the mobile object has changed from turning to traveling straight, prohibiting the first assistance image from being displayed at the empty parking space positioned behind the mobile object just after the state change.

4. The parking assistance method according to claim 1, further comprising:
   detecting a turning angle of the mobile object; and
   in a case where the turning angle of the mobile object has become larger than or equal to a specified value, prohibiting the first assistance image from being displayed.

5. The parking assistance method according to any claim 1, further comprising:
   detecting a turning angle of the mobile object and a speed of the mobile object; and
   in a case where the turning angle of the mobile object is larger than or equal to a specified value and where the speed of the mobile object is larger than or equal to a second specified value, prohibiting the first assistance image from being displayed.

6. The parking assistance method according to claim 1, further comprising:
   in a case where the empty parking space has been detected when the mobile object is turning, displaying a second assistance image at a certain position different from the position of the empty parking space in the surrounding image, the second assistance image indicating that the empty parking space has been detected.

7. The parking assistance method according to claim 6, further comprising:
   in a case where the mobile object starts traveling straight when the second assistance image is being displayed, deleting the second assistance image.

8. A parking assistance method for a parking assistance device that, in a case where a mobile object is traveling in a parking lot to search for an empty parking space that meets a specified condition around the mobile object, displays a first assistance image at a position of the empty parking space in a surrounding image that is a view of an area including the mobile object from above, the first assistance image indicating the empty parking space, the parking assistance method comprising:
   determining whether the mobile object is turning; and
   in a case where it is determined that the mobile object is turning, maintaining displaying the surrounding image and prohibiting the first assistance image in the surrounding image from being displayed.

9. A parking assistance device comprising:
   a surrounding-image generation circuit that generates a surrounding image that is a view of surroundings of a mobile object from above;
   an image display circuit that displays a first assistance image at a position of an empty parking space in the surrounding image, the first assistance image indicating the empty parking space; and
   a turning determination circuit that determines whether the mobile object is turning, wherein
   in a case where it is determined by the turning determination circuit that the mobile object is turning, the image display circuit maintains displaying the surrounding image and prohibits the first assistance image in the surrounding image from being displayed.

* * * * *